United States Patent [19]

Uhrner

[11] 4,136,885
[45] Jan. 30, 1979

[54] AXIAL SHAFT SEALING UNIT FOR SEALING A STATIONARY MACHINE PART RELATIVE TO A ROTATABLE MACHINE PART

[75] Inventor: Klaus-Jürgen Uhrner, Leingarten, Fed. Rep. of Germany

[73] Assignee: Kupfer-Asbest-Co. Gustav Bach, Heilbronn, Fed. Rep. of Germany

[21] Appl. No.: 872,059

[22] Filed: Jan. 25, 1978

[30] Foreign Application Priority Data

Jan. 26, 1977 [DE] Fed. Rep. of Germany ....... 2703104

[51] Int. Cl.² .......................... F16J 15/18; F16J 15/36
[52] U.S. Cl. ...................................... 277/9.5; 277/42; 277/189
[58] Field of Search .................... 277/1, 9, 9.5, 10, 11, 277/38–43, 50, 81 R, 88, 182, 183, 186, 187, 189, 189.5

[56] References Cited

U.S. PATENT DOCUMENTS

| 1,856,581 | 5/1932 | Mitchell | 277/9 |
| 3,123,364 | 3/1964 | Ennis | 277/1 |
| 3,536,333 | 10/1970 | Gits et al. | 277/38 |
| 3,743,305 | 7/1973 | Berens et al. | 277/189 |
| 3,813,102 | 5/1974 | Derman | 277/9 |
| 3,947,944 | 4/1976 | Washington | 277/1 |

FOREIGN PATENT DOCUMENTS

| 1138637 | 1/1957 | France | 277/42 |
| 802247 | 10/1958 | United Kingdom | 277/42 |

*Primary Examiner*—Robert S. Ward, Jr.
*Attorney, Agent, or Firm*—Walter Becker

[57] ABSTRACT

An axial shaft sealing unit for sealing a stationary machine part relative to a rotatable machine part. The sealing unit includes a slide ring seal mounted on the stationary machine part in a sealing manner and includes a housing with a bottom located transversely to the axis of the slide ring seal, a primary seal forming a sliding ring, a bellows-like secondary seal, and a compression spring arranged between the primary seal and the housing bottom or base. The bellows-like secondary seal is vulcanized in a position which corresponds substantially to its installed position and is held in this position in its operative state by a detachable holder. A counter ring rests directly against a machine component which is non-rotatably connected to the rotatable machine part.

18 Claims, 8 Drawing Figures

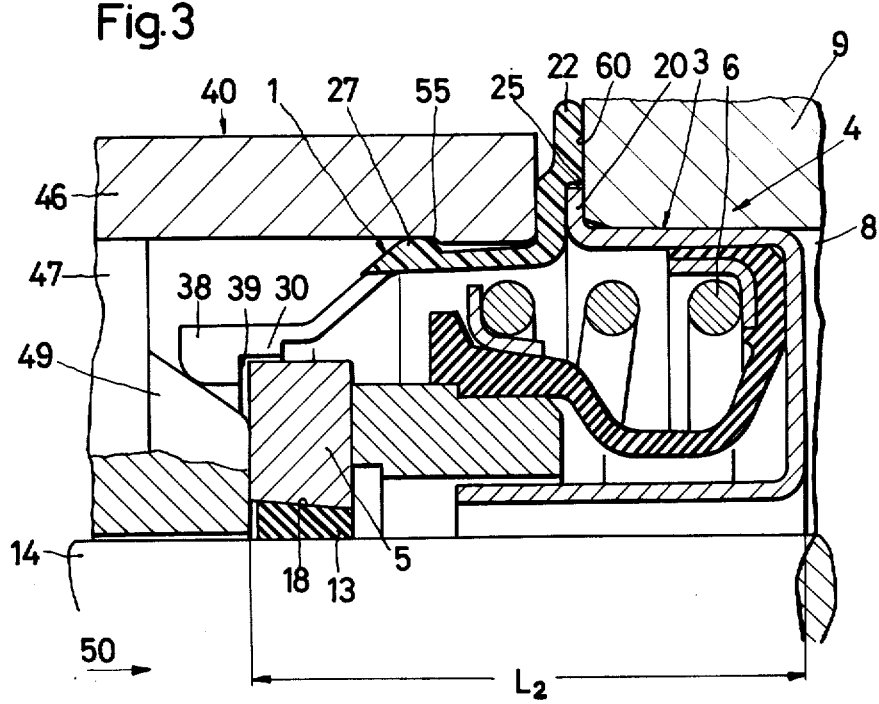
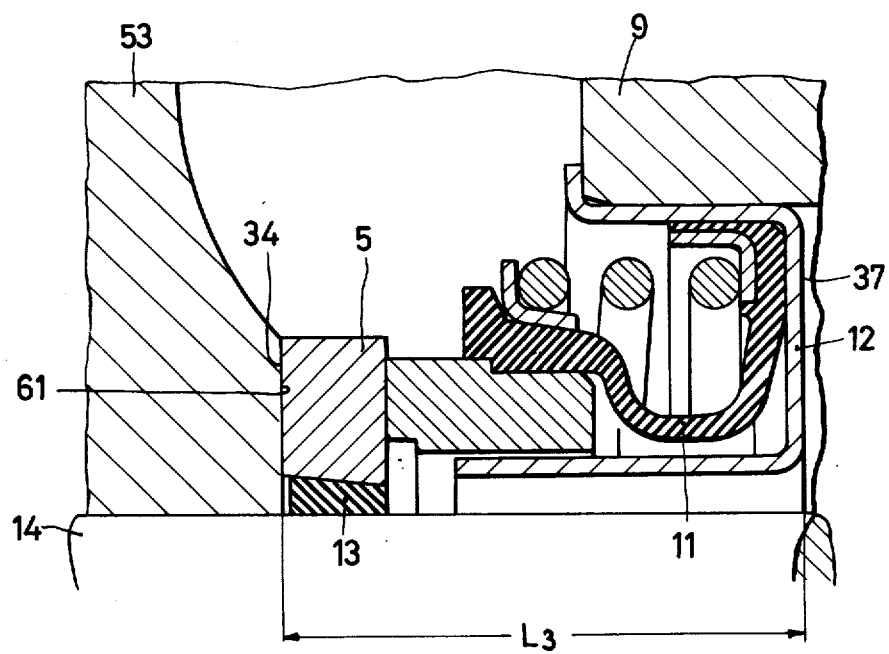

AXIAL SHAFT SEALING UNIT FOR SEALING A STATIONARY MACHINE PART RELATIVE TO A ROTATABLE MACHINE PART

The present invention relates to an axial shaft sealing unit for sealing a stationary machine part relative to a rotatable machine part, especially a shaft of a pump. The sealing unit comprises a slide ring seal which is mounted on the stationary machine part in a sealing manner and includes a housing with a bottom located transversely to the axis of the slide ring seal, a primary seal designed as a sliding ring, a bellows-like secondary seal, and a compression spring arranged between the primary seal and the housing base. The sealing unit also comprises a counter ring which is connectible to the rotatable machine part in a rotation-proof manner and with a counter sealing surface bears against a sealing surface of the primary seal. The sealing unit also comprises a holder by which the counter ring and the slide ring seal are coaxially interconnected.

With a known axial shaft sealing unit of this kind as disclosed in German Offenlegungsschrift No. 2,531,749, the holder is formed by a sleeve arranged on the rotatable machine part with a press fit. The housing of the slide ring seal is arranged on the holder. The counter ring surrounds the holder and is secured in the holder with the aid of a rubber ring which has an L-shaped cross section.

The rubber ring surrounding the counter ring has a low heat conductivity so that the frictional heat generated on the sliding ring and the counter ring during operation is carried away insufficiently. This causes a high heat concentration to be formed on the sealing faces, which may lead to premature wear of the sliding ring and/or the counter ring.

When the medium to be sealed off enters the area between the rotatable machine part and the holder, an electro-chemical reaction also causes premature wear of the shaft sealing unit.

During the installation of the shaft sealing unit, the counter ring and the primary seal are axially displaced relative to the bellows-like secondary seal in which connection the bellows-like secondary seal is partially compressed against the thrust of the compression spring. If the secondary seal is vulcanized in a position corresponding to its operating position, it will be the thrust of the compression spring be deformed during the storage period of the shaft sealing unit and will thus be subjected to mechanical stresses. However, if the secondary seal is vulcanized in such a way that it is largely stress-free in the non-installed condition of the shaft sealing unit, it is subjected to additional mechanical stresses in the operating position due to the axial displacement occurring during installation. In either case, the useful life of the bellows-like secondary seal is reduced, because cracks, which are caused by the action of ozone or by aging during the storage time or during operation, are liable to occur at the points where internal mechanical stresses occur in the secondary seal, which consists of elastomeric material.

It is an object of the invention so to design an axial shaft sealing unit of the kind mentioned above that the life of the components of the shaft sealing unit subjected to wear is substantially increased.

These and other objects and advantages of the invention will appear more clearly from the following specification in connection with the accompanying drawings, in which:

FIG. 3 is an axial section of the axial shaft sealing unit of FIGS. 1 and 2 which has been pressed into a pump housing with the aid of the pressing-in tool and whose holder is in the detached position.

FIG. 4 is an axial section of the axial shaft sealing unit of FIGS. 1 and 3 in its operating position.

Figure 1:
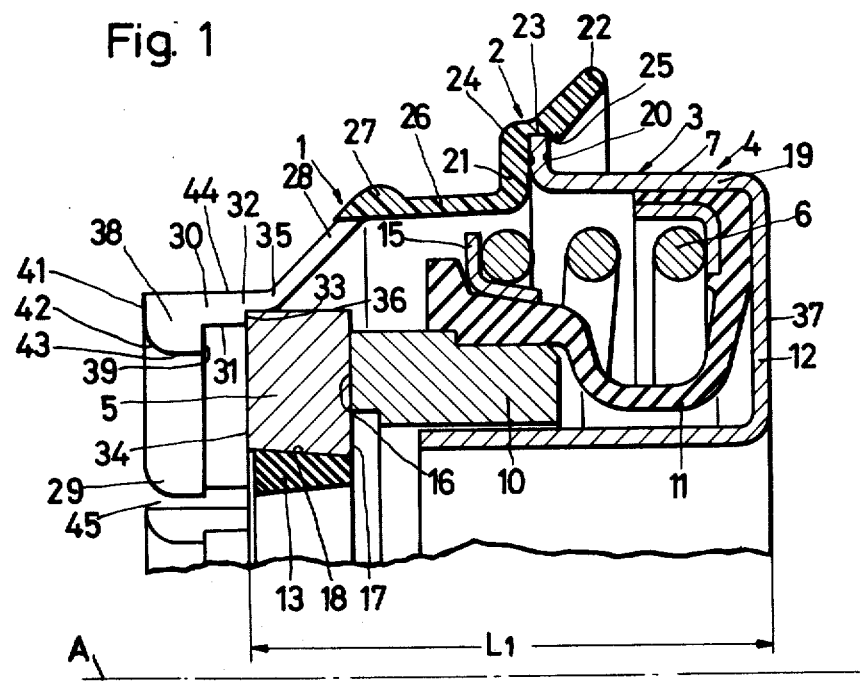
FIG. 1 is an axial section of an axial shaft sealing unit according to the invention in its inoperative position.

The axial shaft sealing unit according to the invention is characterized primarily in that the bellows-like secondary seal is vulcanized in a position which corresponds substantially to its installed position and is held in this position in its inoperative state by the holder which is detachable. The sealing unit according to the invention is furthermore characterized in that the counter ring rests directly against a machine component which is connected to the rotatable machine part in a rotation-proof manner.

Due to the design according to the invention, the bellows-like secondary seal can be kept practically free from stresses during its storage time, which may be very long, whereby it is subjected to minimal damage only, prior to being used. Since the counter ring is brought to its operating position by the machine component, there is no need for considering the tolerance of the machine-dependent installation length of the shaft sealing unit when determining the stroke limitation by the holder.

Therefore, during its storage the bellows-like secondary seal can be removed from its stress-free position only by the short distance resulting from the respective tolerances inherent in the shaft sealing unit itself. However, this distance is so short that practically no deformation stresses occur in the secondary seal. Since the holder is detachable, the medium to be sealed off has unimpeded access to the sliding ring and the counter ring from the moment the shaft seal unit is put into operation, so that the frictional heat developing on these components can be carried away satisfactorily. The removal of the developing frictional heat is further increased by the fact that the counter ring rests directly, that is to say without a heat-insulating intermediate layer, against the machine component, for example a pump impeller. This permits a high heat transfer to occur from the counter ring to the machine component, so that the frictional heat is carried away rapidly. The counter ring counter sealing face, on which the frictional heat is produced, and the opposite counter ring bearing face resting against the machine component are of practically equal size, so that the heat transport within the counter ring in the axial direction through the practically constant cross-sectional area and the heat transfer from the counter ring to the machine component are considerably increased because of the large contact surface that is available. The counter ring and the sliding ring are therefore exposed to a minimal wear, so that the life of these components is increased substantially.

The holder fixing the counter ring to the slide ring seal in the axial direction can again be used after its removal from the axial shaft sealing unit, which is economically of advantage. Furthermore, due to the detachable arrangement of the holder, slide ring seals already available can later be assembled in a simple manner to form an axial shaft sealing unit.

Further features of the invention emerge from the description, the claims and the drawings.

In the embodiments shown in FIGS. 1 to 8, the holders 1, 1a, 1b overlap the axial shaft seal unit only from the outside. The holder is detachably connected to a housing 3, 3a, 3b of the slide ring seal 4, 4a, 4b by means of a snap connection 2, 2a, 2b. The holder furthermore serves as the axial limitation for a counter ring 5, 5a, 5b which by means of the thrust of a compression spring 6, 6a, 6b is axially pressed against the holder.

In the embodiment of the invention shown in FIGS. 1 to 4, the housing 3 of the slide ring seal 4 is ring-shaped and cup-shaped in cross section. The outside surface 7 of the housing 3 forms a seating surface, with which the slide ring seal 4 can sealingly be inserted with press fit into a recess 8 in the stationary machine part 9, which in the exemplified embodiment is a pump housing (FIG. 3). A portion of the primary seal 10, which is designed as a sliding ring, is accommodated in the housing 3. A bellows-shaped secondary seal 11 is supported at one end on the primary seal 10, the other end of seal 10 being supported by the base 12 of the housing 3. The primary seal 10, the secondary seal 11 and the housing 3 form the slide ring seal 4 which is connected to the counter ring 5 by means of the holder 1. The counter ring 5 is fastened to the rotating machine part 14 (FIG. 3), which in the exemplified embodiment shown is a pump shaft, in a rotation-proof and sealing manner by the aid of a holding collar 13 consisting of elastomeric material.

The bellows-shaped secondary seal 11, which is vulcanized in its operating position, is pressed against the sliding ring 10 in a radially sealing manner by a spring plate 15. The secondary seal 11 also consists of an elastomeric material. The compression spring 6, which is coaxial with the housing 3, with the secondary seal 11, with the primary seal 10 and with the counter ring 5, presses the sliding ring 10 axially against the counter ring 5. The compression spring 6 is arranged substantially within the housing 3. Due to the thrust of the compression spring, the sliding face 16 of the sliding ring 10 and the counter sealing face 17 of the counter ring 5 rest flatly against one another. The sliding face 16 and the counter sealing face 17 are located in one and the same plane.

In order to obtain a simple mounting of the counter ring 5 on the pump shaft 14, the holding collar 13 and the counter ring 5 are frictionally connected to each other, preferably in the manner of a key joint 18, which allows a particularly simple centering of the counter ring 5.

According to FIG. 1, the holder 1 is coaxial with the individual sealing parts and is cap-shaped. The holder 1, together with the housing 3, forms a kind of mantle surrounding the sealing parts 5, 10, 11, so that these are protected to a high degree during their storage. The holder 1 is detachably connected to the housing 3 by the snap connection 2. To this end, the outer jacket 19 of the housing 3 comprises a flange which is bent off to the outside approximately at a right angle and which positively connects the housing 3 to the holder 1. The flange 20 rests, approximately over its entire length, against a shoulder 21 of the holder 1. The shoulder 21 extends transverse in the drawing perpendicular to the axis A of the shaft sealing unit and in the direction toward the housing 3 adjoins a holder edge 22 which is directed radially obliquely toward the outside. The encircling edge 22 preferably forms an angle of 45° with the axis A of the holder 1. The transition section from the edge 22 to the shoulder 21 has on its inside provided an annular groove 23 which is engaged by the flange 20 of the housing 3. The annular groove 23 is bounded in the axial direction by the inner surface 24 of the shoulder 21 and by a projection 25 which serves as a detent and forms a portion of the angled edge 22 of the holder 1. The flange 20 of the housing 3 is securely held in the annular groove 23. Due to the conical design of the edge 22, the placing of the cap-shaped holder 1 on the housing 3 is substantially facilitated.

The shoulder 21 adjoins a cylindrical holder section 26 which at that end thereof which is remote from the shoulder 21 comprises a radially externally directed annular bead or interlocking part 27. The part 27 is circular-segment-shaped in cross section, as is shown in FIG. 1. That portion of the cylindrical section 26, which comprises the interlocking part 27, merges with a conical intermediate section 28 which tapers in the direction toward an inlet opening 29 of the holder 1 and with the cylindrical section 26 forms an angle of approximately 135°. When mounting the holder 1 said frusto-conical intermediate section 28 facilitates the insertion of the counter ring 5 into its FIG. 1 position.

The intermediate section 28 adjoins a cylindrical end section 30 of the holder 1, which section comprises the inlet opening 29. The inner surface 31 of this cylindrical section 30 is provided with a step 32 having a radially disposed face 33 against which bears the edge of the bearing face 34 of the counter ring 5. Thus the step 32 limits the axial movement of the counter ring 5, so that the latter is perfectly secured when the shaft sealing unit is out of operation. The diameter of the step 32 is slightly smaller than the outside diameter of the counter ring 5, so that the surface 35 of the step 32 rests under tension against the surface 36 of the counter ring 5. In this way, the position of the counter ring 5 is also secured in the radial direction. As FIG. 1 shows, the axial length of the surface 35 of the step 32 is less than the corresponding length of the surface 36 of the counter ring 5.

The distance, measured in the axial direction A, between the face 33 and the projection 25 of the snap connection 2 is such that the secondary seal 11 is held in its position in which it is vulcanized in the operating position, so that the secondary seal is practically free from stresses. The axial distance between the bearing face 34 of the counter ring 5 and the base surface 37 of the housing bottom 12 is designated by L1 in FIG. 1.

The inlet opening 29 of the holder 1 is bounded by a radially disposed circular collar 38, whose inner face 39 adjoins the inner face 31 of the cylindrical section 30 approximately at a right angle. This face 39 forms a safety stop for the counter ring 5 in the event of the face 33 of step 32 being unintentionally released prior to the insertion of the axial shaft sealing unit into the mounting device 40, which is partially shown in FIG. 2. In the event of such an unintentional detachment of the stop formed by the step 32, the counter ring 5 will, due to the thrust of compression spring 6 strike with its bearing face 34 against the inner face 39 of the collar 38, so that an unintentional separation of the slide ring seal 4 and the counterring 5 is reliably prevented.

The distance measured in the axial direction between the inner face 39 of the collar 38 and the projection 25 of the snap connection 2 is such that when the counter ring 5 comes to rest against the inner face 39, the length of the axial shaft sealing unit, measured from the bearing face 34 of the counter ring 5 to the bottom surface 37 of the housing 3, is less than the corresponding length of the slide ring seal 4 and the counter ring 5 in the unstressed position but is greater than the maximum corresponding length dependent on the pump, and is furthermore greater than the length L2 (FIG. 2) which corresponds to the axial distance between the bearing face 34 of the counter ring 5 and the bottom surface 37 of the housing bottom 12. The inside diameter of the collar 38 is substantially shorter than the outside diameter of the counter ring 5, so that an unintentional slipping of the counter ring 5 from the holder 1 is reliably avoided. The front face 41 of the collar 38, which is parallel to the inner face 39, merges with a curved guiding surface 42 which adjoins an inner surface 43 which is parallel to the outer surface 44 of the cylindrical section 30 and adjoins the inner face 39 of the collar 38 at right angles.

To increase the radial movability of the cylindrical section 30, the latter as well as the frusto-conical intermediate section 28 of the holder 1 is in the illustrated embodiment by axially extending slots 45 subdivided into four spring tongues.

Figure 2:
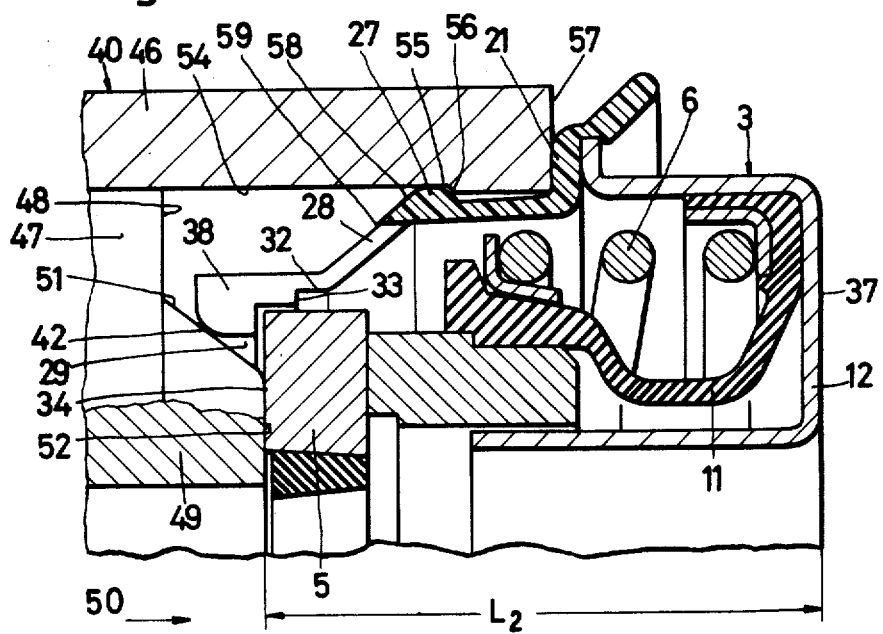
FIG. 2 is an axial section of the axial shaft sealing unit of FIG. 1 which has been inserted into a pressing-in tool.

FIG. 2 shows how the axial shaft sealing unit shown in FIG. 1 is inserted in the mounting device 40. This device 40 comprises a sleeve-shaped guide 46 and an ejector 47 which is axially movably located in said guide 46. At its front end 48 the ejector 47 carries an annular lug 49, which is frusto-conical in cross section and tapers in the ejecting direction 50. The shortest outside diameter of this lug 49 is less than the inside diameter of the collar 38 of the holder 1.

When the axial shaft sealing unit is inserted into the guide 46, the guiding surface 42 of the collar 38, which guiding surface is rounded in cross section, rolls onto the conical surface 51 of the lug 49. Due to the curved design of the guiding surface 42, the holder 1 is reliably prevented from canting when it is inserted into the mounting device 40. As the insertion of the shaft sealing unit progresses, the holder is, due to the frusto-conical lug 49, inevitably expanded in the area of its collar 38 and of the frusto-conical intermediate section 28. The lug 49 thus serves as an expanding element, with the aid of which the inlet opening 29 of the holder 1 is radially widened. The lug 49 is designed in such a way that as the holder 1 is widened, the counter ring 5 disengages the face 33 of the holder step 32 and, by the thrust of the spring 6, is displaced in the axial direction against the ejector 47 until its bearing surface 34 rests against the face 52 of the lug 49. The axial distance 12 between the bearing face 34 of the counter ring 5 and the base surface 37 of the housing base 12 is greater than the maximum corresponding pump-dependent length.

In the position shown in FIG. 2, the bellows-shaped secondary seal 11 has changed its vulcanized shape (FIG. 1), so that stresses occur in the secondary seal 11 until the axial shaft sealing unit is pressed into the pump housing 9 (FIG. 3) and an impeller 53 is pressed on the pump shaft 14 (FIG. 4). However, this time is negligibly short, so that the occurring deformation stresses cannot damage the secondary seal 11.

A step 55 is provided on the inner surface 54 of the guide 46 of the mounting device 40 as a counter interlocking part for the interlocking part 27 of the holder 1. When the shaft seal unit is inserted into the guide 46, the interlocking part 27 passes of its own accord into the counter interlocking part 55. As will be seen from FIG. 2, with its detent 27, the holder 1 forming the interlocking part, engages behind the step 55, the face 56 of which forms an obtuse angle with the inner surface 54 and rests against the detent 27. Due to this detent connection between the guide 46 and the holder 1, the mounting device 40 can automatically receive the shaft sealing unit, for example from an automatic feeding means. In this connection, the shaft sealing unit is inserted into the guide 46 merely until the face 57 of the guide 46 rests against the shoulder 21 of the holder 1.

When the shaft seal unit is inserted into the guide 46, the shaft sealing unit needs to be only approximately in its insertion position because, due to the conical intermediate section 28 of the holder 1, the shaft sealing unit is automatically moved into its exact insertion position when it is attached to the mounting device 40. The interlocking part 27 of the holder 1 has an abutting surface 58 which forms a common conical surface with the outer surface 59 of the intermediate section 28. The abutting surface 58 thus forms a continuation of the outer surface 59, whereby the insertion into the guide 46 is substantially facilitated. Due to the circular-segment-shaped design of the detent 27, the guide 46 can without difficulty be shifted into its locking position beyond the detent 27, in which position the face 56 of the step 55 rests against the detent 27. By this means, the holder 1 is secured in the axial direction against dropping from the mounting device 40. In order to bring about a radial centering of the shaft sealing unit relative to the mounting device 40, the largest outside diameter of the circular detent 27 of the holder 1 is larger than the inside diameter of the guide 46 so that, in the position shown in FIG. 2, the holder 1 rests against the guide 46 by elastic bracing.

The axial shaft sealing unit inserted into the guide 46 is by means of the mounting device 40 (FIG. 3) inserted into the recess 8 of the pump housing 9. In the installed position, the housing 3 of the slide ring seal 4 is arranged in the recess 8 with press fit and rests with its flange 20 against the front end 60 of the pump housing 9. When the axial shaft sealing unit is inserted into the recess 8, the edge 22 of the holder 1 is bent backwards in the opposite sense to the direction of insertion, because it rests against the face 60 of the pump housing 9 while the insertion is effected. In the installed position shown in FIG. 3, the edge 22 rests over its entire width against the face 60.

During the bending-over of the edge 22, the projection 25 bounding the annular groove 23 is taken from the position shown in FIGS. 1 and 2 to the position shown in FIG. 3, in which it is located radially outside the flange 20 of the housing 3. As a result, the projection 25 can no longer serve as the axial protection for the housing 3 when the mounting device 40 is withdrawn in the sense that is opposite to the direction of insertion 50.

While the slide ring seal 4 is pressed into the recess 8 of the pump housing 9, the counter ring 5 is simultaneously pushed on the pump shaft 14 by the ejector 47 and the lug 49 respectively of the mounting device 40. During this process, the ejector 47 does not move relative to the guide 46. When the placement on the pump shaft 14 occurs, the holding collar 13, which is slightly shorter in the axial direction than the counter ring 5, is tensioned radially so that, due to the frictional grip, the holding collar 13 maintains its position on the pump shaft 14 after the withdrawal of the mounting device 40. The tension in the compression spring 6 is not sufficient to displace the holding collar on the pump shaft. The counter ring 5 is pressed in the opposite sense to the direction of insertion 50 by the thrust of spring 6. The key joint 18 between the counter ring and the holding collar 13 aids in securing the counter ring on the holding collar.

When the mounting device 40 is withdrawn from the position shown in FIG. 3, the holder 1 remains in the mounting device, due to the detent connection 27, 55, to the guide 46, and is thus removed from the axial shaft seal unit. The removal of the holder 1 is facilitated by the fact that the cylindrical section 30 as well as the inner face 31 have a clearance from the counter ring 5, so that no friction occurs between the holder and the counter ring when the withdrawal is effected. After the holder 1 has been taken off, it can be ejected from the guide 46 with the aid of the ejector 47.

The final operating position of the counter ring 5 is determined by the impeller 53 to be pressed on the pump shaft 14 (FIG. 4). By this means, the counter ring 5 is in any case aligned at right angles and with the minimum eccentricity relative to the pump shaft 14. The bearing face 34 of the counter ring 5 rests with its entire surface against the contact surface 61 of the impeller 53. Due to the intimate contact between these two surfaces 34 and 61, an optimum heat transfer from the counter ring 5 to the impeller 53 is insured. The distance L3 between the bearing surface 34 of the counter ring 5 and the base surface 37 of the housing base 12 corresponds to the distance L1 in FIG. 1. These two lengths L1 and L3 may, in the most unfavorable case, differ from each other by the amount resulting from the pump-dependent tolerance of the length L3. However, due to the precision that is usual in the manufacturing methods of the respective sealing parts, the difference between these lengths L1 and L3 is in general only slightly more than half the tolerance width of the pump-dependent length L3, so that the bellows-shaped secondary seal 11 is largely free from deformation stresses when the axial shaft seal unit is in the inoperative condition and when it is in operation.

The counter ring 5 and the holding collar 13 have simple sections, which can be easily manufactured at low cost and can be fitted in a simple manner. Due to the detent 27, the axial shaft sealing unit is particularly suitable for a fully automatic fitting because, when the axial shaft sealing unit is inserted into the mounting device, it automatically engages therein and in so doing aligns itself so as to be coaxial with the mounting device. Furthermore, when the insertion into the mounting device is effected, the stop limitation for the counter ring 5 is automatically and by itself released and so is the snap connection 2 between the holder 1 and the slide ring seal 4 when the slide ring seal is pressed into the pump housing 9, so that the installation of the axial shaft sealing unit into the respective assembly can be carried out in a simple manner. When the mounting device is withdrawn, the holder 1 is taken along due to the detent connection and can then be ejected with the aid of the ejector, for example into a collecting vessel.

Figure 5:
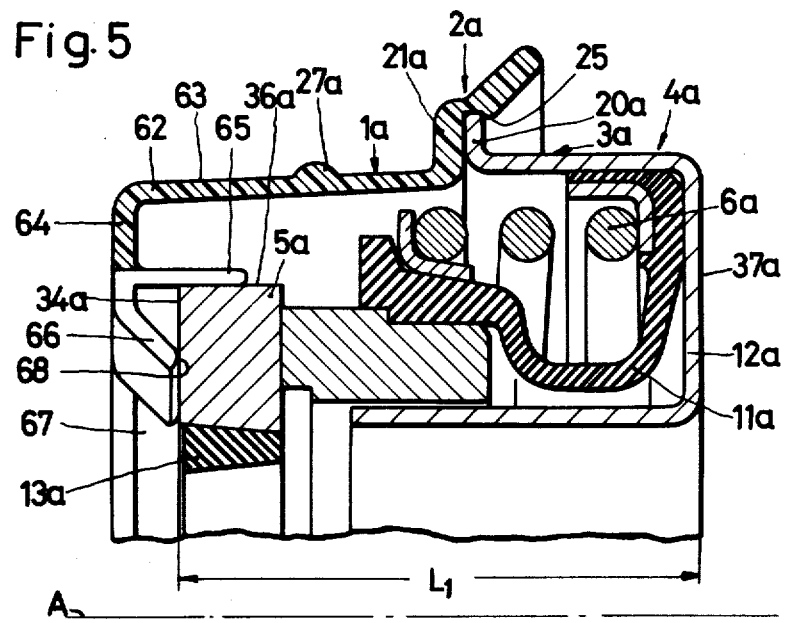
FIG. 5 is an axial section of a second embodiment of an axial shaft sealing unit according to the invention.
Figure 6:
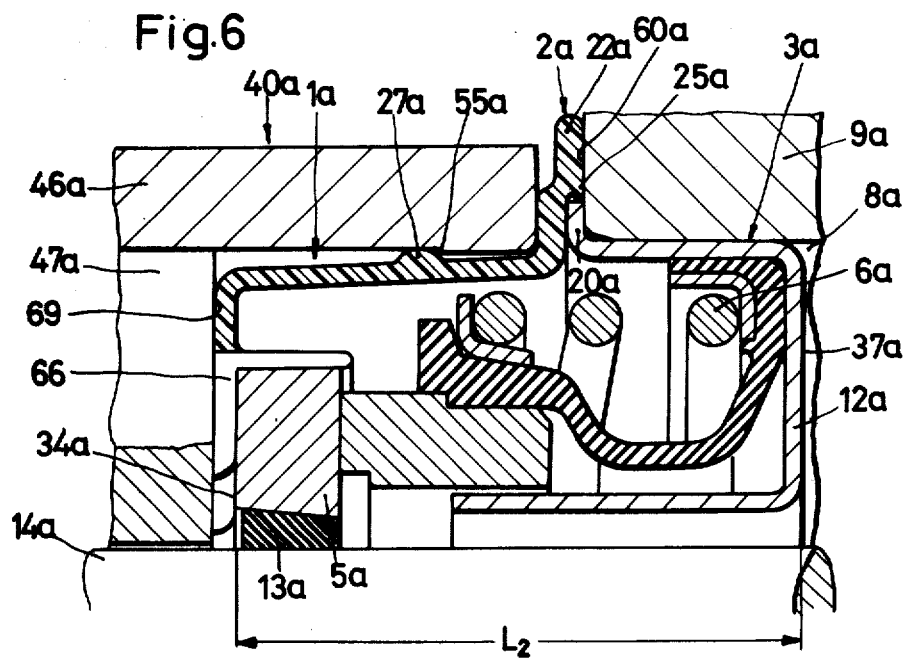
FIG. 6 is an axial section of the axial shaft sealing unit of FIG. 5 which has been pressed into a pump housing with the aid of a pressing-in tool and the holder of which is in the detached position.

In the embodiment shown in FIGS. 5 and 6, the holder 1a is also detachably connected to the housing 3a of the slide ring seal 4a by means of a snap connection 2a. This snap connection is designed in the same way so that of the afore-described embodiment of the invention. The slide ring seal 4a and the counter ring 5a are also designed in the same way as in the embodiment of FIGS. 1 to 4.

The holder 1a comprises a cylindrical section 62 which adjoins the shoulder 21a approximately at right angles and the surface 63 of which is provided, approximately in the center, with the radially outwardly projecting annular interlocking part 27a. The cross section of the interlocking part 27a is of circular segment shape. At that end of the cylindrical section 62 which is remote from the shoulder 21a, said section 62 merges with an edge 64 which extends radially inwardly directed in the direction toward the axis A of the holder 1a. Edge 64 is adjoined by several — in the exemplified embodiment six — tongues 66, which are obliquely directed towards the axis A and in the direction of the slide ring seal 4a, and six tongues 65, which are approximately parallel to the surface of the cylindrical section 62 and are directed towards the slide ring seal 4a. Both the tongues 65 and the tongues 66 are separated by slots 67.

The face 68 of the obliquely inwardly directed tongues 66 is curved in cross section (FIG. 5) and forms a path limitation in the axial direction for the counter ring 5a, the bearing surface 34a of which rests against the faces 68 of the tongues 66 under the thrust of the spring 6a. The tongues 66 are directed obliquely inwardly into the holder 1a to such an extent that the distance L1, measured in the axial direction, between the bearing surface 34a of the counter ring 5a and the base surface 37a of the housing base 12a is the same as the corresponding axial distance L1 in the preceding embodiment.

The stiffness of the obliquely inwardly directed tongues 66 is such that they can without any substantial deformation withstand a force which acts in the axial direction and slightly exceeds the maximum force exerted by the compression spring 6a. By this means, it is insured that the bellows-shaped secondary seal 11a is deformed to a negligible extent only when the shaft sealing unit is inoperative.

The tongues 65, which project approximately at right angles from the edge 64 in the direction toward the housing 3a and are separated from each other by the axial slots 67, serve as centering tongues for the counter ring 5a, against the outer surface 36a of which the tongues 65 rest over a portion of their length. Advantageously, these tongues 65 rest against the counter ring 5a with elastic tension, so that the latter is reliably centered in the radial direction of the holder 1a, and thus the slide ring seal 4a, even when its outside diameter has a major tolerance. Furthermore, the resilient design of the tongues 65 facilitates the insertion of the counter ring 5a so that it has the position shown in FIG. 5.

When the shaft seal unit is inserted into the mounting device 40a (FIG. 6), the interlocking part 27a of the holder 1a engages the counter interlocking part 55a of the sleeve-shaped guide 46a of the mounting device. The mounting device of the constructional form shown in FIGS. 5 and 6 is substantially of the same design as the mounting device 40 according to the preceding constructional form. However, the ejector 47a does not comprise a lug. When the shaft sealing unit is inserted into the recess 8a of the pump housing 9a, the obliquely radially outwardly directed edge 22a of the holder 1a, which edge is directed towards the housing 3a, is bent, due to its impingement on the face 60a of the pump housing 9a, until it rests over approximately its entire radial width against the face of the pump housing, as shown in FIG. 6. In this position, the projection 25a is located radially beside the flange 20a of the housing 3a, so that the snap connection 2a between the holder and the housing is released.

The housing 3a is with press fit inserted in the recess 8a of the pump housing 9a and has its flange 20a resting on the face 60a of the pump housing. In the position shown in FIG. 6, the counter ring 5a is in its installed position, in which its bearing surface 34a is axially spaced by the distance L2 from the bottom surface 37a of the housing bottom 12a. The axial displaceability of the counter ring 5a by the pump shaft 14a is assured by the deformability of the obliquely inwardly directed tongues 66. During the fitting of the axial shaft sealing unit, the holding collar 13a of the counter ring 5a is pressed onto the pump shaft 14a. In this connection, the radial pressing of the holding collar 13a onto the pump shaft causes a frictional force to be formed which is equidirectional to the thrust of the compression spring 6a and the magnitude of which is at least equal to the thrust of the compression spring. As a result thereof, when the counter ring 5a is pressed onto the pump shaft 14a, the force required for the axial support of the counter ring must equal at least twice the force exerted by the compression spring. However, since the stiffness of the tongues 66 supporting the counter ring 5a is such that they are only capable of withstanding the force exerted by the compression spring 6a without being substantially deformed, the tongues 66 are bent in the direction in which act the thrust of the compression spring and the frictional force until said tongues lie flat between the face 69 of the ejector 47a and the bearing surface 34a of the counter ring 5a (FIG. 6).

When the mounting device 40a is withdrawn, the holder 1a due to the positive connection 27a, 55a remains with the guide 46a in the mounting device. The holder can then be ejected with the aid of the ejector 47a, for example into a collecting vessel. The counter ring 5a assumes its final operating position by the pump impeller which is to be fastened on the shaft 14a and against which the counter ring 5a rests in its operating position.

Figure 7:
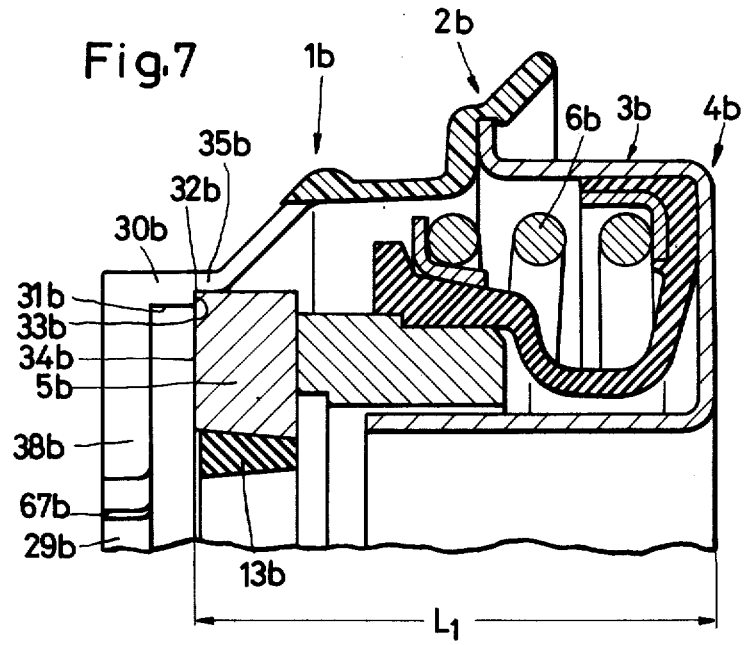
FIG. 7 is an axial section of a third embodiment of an axial shaft sealing unit according to the invention.
Figure 8:
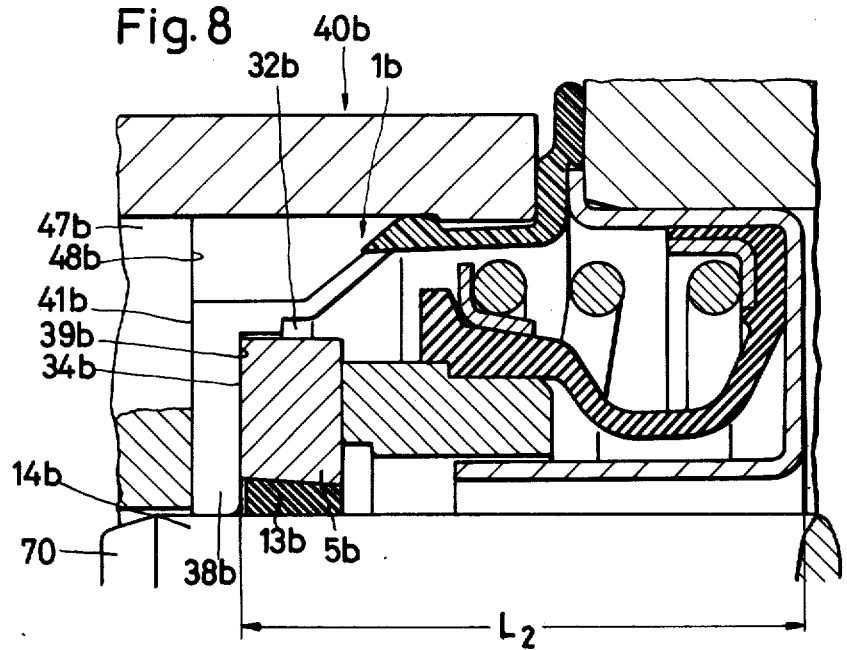
FIG. 8 is an axial section of the axial shaft sealing unit of FIG. 7 which has been inserted into a pump housing with the aid of a pressing-in tool and the holder of which is in its detached position.

The embodiment of the axial shaft sealing unit of the invention as shown in FIGS. 7 and 8, corresponds substantially to the embodiment shown in FIGS. 1 to 4. However, the collar 38b of the holder 1b extends inwardly in the radial direction to such an extent that the clear width of the inlet or introduction opening 29b, bounded by the edge 38b, is less than the diameter of the pump shaft 14b by at least the difference between the inside diameter of the surface 35b of the step 32b and the diameter of the inner face 31b of the cylindrical section 30b of the holder 1b.

The radially outer edge of the bearing surface 34b of the counter ring 5b rests against the face 33b of the step 32 under the tension in the spring 6b. When the axial shaft sealing unit inserted into the mounting device 40b is placed on the pump shaft 14b, the collar 38b is radially widened by the pump shaft 14b because the clear width of the introduction opening 29b of the holder 1b is less than the diameter of the pump shaft 14b. The pump shaft 14b has a conical end 70, upon which the collar 38b impinges when placed on the pump shaft. In accordance with the obliquely extending conical surface, the collar 38b is then continuously expanded, as the insertion of the shaft sealing unit progresses, until the clear width of the introduction opening 29b corresponds to the pump shaft diameter. Since the outer face 41b of the collar 38b rests against the face 48b of the ejector 47b, the segments of the collar 38b, which are formed by the slots 67b, slide radially outwards along the face 48b of the ejector 47b and in so doing automatically increase the inside diameter of the step 32b. When the inside diameter of the step 32b equals at least the outside diameter of the counter ring 5b, the axial path limitation for the counter ring is released. Due to the frictional grip between the holding collar 13b and the pump shaft 14b, the counter ring remains stationary relative to the pump shaft until the bearing surface 34 of the counter ring 5b rests against the inner face 39b of the collar 38b during the pressing-in process of the axial shaft sealing unit. As the pressing-in of the axial shaft seal unit progresses, the counter ring 5b is then axially taken along by the collar 38b, which is axially supported on the face 48b of the ejector 47b, until the shaft sealing unit has reached its position shown in FIG. 8. This position corresponds to the position of the axial shaft sealing unit shown in FIG. 3. The axial shaft sealing is given its final operating position by the pump impeller which is to be placed upon the pump shaft 14b and against which the counter ring 5b rests.

It is, of course, to be understood that the present invention is, by no means, limited to the specific showing in the drawings, but also comprises any modifications within the scope of the appended claims.

What I claim is:

1. An axial shaft sealing unit for sealing a stationary machine part relative to a rotatable machine part, especially a pump shaft, which includes: a slide ring seal adapted to be mounted on a stationary machine part in a sealing manner and comprising a housing with a bottom surface located transversely to the slide ring seal axis, a primary seal forming a sliding ring and having a sealing surface; a bellows-like secondary seal, and compression spring means arranged between said primary seal and said housing bottom surface; a counter ring connectible to said rotatable machine part in a rotation-proof manner and resting with said counter sealing surface against said sealing surface of said primary seal; a holder interconnecting said counter ring and said slide ring seal; said counter ring and said slide ring being coaxially arranged with regard to each other; said bellows-like secondary seal being vulcanized in a position corresponding substantially to its installed position and being held in said last mentioned position by said holder; said holder being detachable; and a machine component for non-rotatable connection to the rotatable machine part; said counter ring resting directly against said machine component.

2. A shaft sealing unit according to claim 1, which includes snap connection means and in which said holder for the counter ring and the slide ring seal is cap-shaped and is detachably connected to said housing of the slide ring seal by said snap connection means.

3. A shaft sealing unit according to claim 1, which includes a compression spring, and in which said holder comprises an axial stop for said counter ring, said compression spring holding said counter ring in engagement with said stop.

4. A shaft sealing unit according to claim 1, in which said counter ring is fixed in the axial and radial directions by said holder.

5. A shaft sealing unit according to claim 4, in which said counter ring frictionally engages said holding collar, and in which said holding collar has approximately the same axial length as said counter ring and is non-rotatably connectible to the rotatable machine part.

6. A shaft sealing unit according to claim 1, in which said holder has on its outside at least one interlocking part for engagement with a corresponding counter interlocking part of a pressing-in tool for inserting said shaft sealing unit into the stationary machine part.

7. A shaft sealing unit according to claim 6, in which said interlocking part has an abutting surface extending to the front and top in the slide-on direction of the pressing-in tool.

8. A shaft sealing unit according to claim 7, in which said holder has a cylindrical section comprising said interlocking part.

9. A shaft sealing unit according to claim 1, in which said housing includes a flange and in which said holder has a circular groove engaged by said flange, said holder having a shoulder against which said flange rests, said shoulder extending approximately at right angles to the axis of said slide ring seal and being adjoined by a marginal portion of said holder, said marginal portion being directed towards said housing and extending obliquely outwardly with respect to the axis of said holder.

10. A shaft sealing unit according to claim 3, in which one end of said holder is located in the area of said counter ring and comprises an introduction opening for the pressing-in tool, said opening being elastically expandable for the release of said axial stop.

11. A shaft sealing unit according to claim 10, in which said introduction opening is bounded by at least one collar located approximately radially to the axis of said holder.

12. A shaft sealing unit according to claim 10, in which said collar comprises an outer surface inclined relative to the axis of said holder.

13. A shaft sealing unit according to claim 12, in which said outer surface forms a guiding surface for an ejector of the pressing-in tool, said ejector being arranged in a sleeve-shaped guide for the holder, said guide being stop-bounded on said shoulder.

14. A shaft sealing unit according to claim 13, in which said guide comprises the counter interlocking part for the interlocking part of the holder.

15. A shaft sealing unit according to claim 13, in which said ejector comprises at least one expanding member for said introduction opening of said holder, said expanding member being in the form of a frustum of a cone tepering to the front in the slide-on direction of the pressing-in tool.

16. A shaft sealing unit according to claim 9, in which said marginal portion of said holder directed towards said housing of said slide ring seal is elastically deformable in response to the shaft sealing unit being pressed into a recess for the release of said snap connection.

17. A shaft sealing unit according to claim 3, which includes an axial stop for said counter ring, said stop being formed by elastically deformable tongues which are located obliquely to the axis of said holder, the dimensional stability of said tongues being greater than the tension in said compression spring acting on the counter ring.

18. A shaft sealing unit according to claim 1, in which a frusto-conical portion of the rotatable machine part is provided as the expanding member for the radial expansion of the introduction opening of said holder.

* * * * *